(12) United States Patent
Bolender

(10) Patent No.: US 9,024,907 B2
(45) Date of Patent: May 5, 2015

(54) INPUT DEVICE WITH CAPACITIVE FORCE SENSOR AND METHOD FOR CONSTRUCTING THE SAME

(75) Inventor: Robert J. Bolender, Guelph (CA)

(73) Assignee: Synaptics Incorporated, San Jose, CA (US)

( * ) Notice: Subject to any disclaimer, the term of this patent is extended or adjusted under 35 U.S.C. 154(b) by 623 days.

(21) Appl. No.: 12/418,433

(22) Filed: Apr. 3, 2009

(65) Prior Publication Data

US 2010/0253645 A1 Oct. 7, 2010

(51) Int. Cl.
 *G06F 3/045* (2006.01)
 *G06F 3/044* (2006.01)
 *G06F 3/041* (2006.01)

(52) U.S. Cl.
 CPC .............. *G06F 3/044* (2013.01); *G06F 3/0414* (2013.01)

(58) Field of Classification Search
 None
 See application file for complete search history.

(56) References Cited

U.S. PATENT DOCUMENTS

| | | | |
|---|---|---|---|
| 4,290,052 A * | 9/1981 | Eichelberger et al. | 341/33 |
| 4,719,538 A | 1/1988 | Cox | |
| 5,492,020 A | 2/1996 | Okada | |
| 5,510,813 A | 4/1996 | Makinwa et al. | |
| 5,854,625 A | 12/1998 | Frisch et al. | |
| 5,942,733 A | 8/1999 | Allen et al. | |
| 5,945,980 A | 8/1999 | Moissev et al. | |
| 5,973,668 A | 10/1999 | Watanabe | |
| 6,002,389 A | 12/1999 | Kasser | |
| 6,215,476 B1 | 4/2001 | Depew et al. | |
| 6,642,857 B1 | 11/2003 | Schediwy et al. | |
| 6,888,537 B2 | 5/2005 | Benson et al. | |
| 6,958,614 B2 | 10/2005 | Morimoto | |
| 7,047,818 B2 | 5/2006 | Dallenbach et al. | |
| 7,148,882 B2 | 12/2006 | Kamrath et al. | |
| 7,196,694 B2 | 3/2007 | Roberts | |

(Continued)

FOREIGN PATENT DOCUMENTS

| | | |
|---|---|---|
| JP | 7280671 A | 10/1995 |
| JP | 2009009249 A1 | 1/2001 |

(Continued)

OTHER PUBLICATIONS

International Search Report PCT/US2010/029823 dated Nov. 19, 2010.

(Continued)

*Primary Examiner* — Joseph Haley
*Assistant Examiner* — Ifedayo Iluyomade
(74) *Attorney, Agent, or Firm* — Osha Liang LLP

(57) ABSTRACT

Input devices which include a capacitive force sensor, along with methods of making and using such, are provided. The input device includes a structural component having first and second substantially opposing sides, a plurality of sensor electrodes located on the first side of the structural component, the plurality of sensor electrodes configured to capacitively sense positional information associated with user input in a sensing region, a first capacitive electrode located on the second side of the structural component, the first capacitive electrode being configured to capacitively couple to a second capacitive electrode that is separated from the first capacitive electrode by a gas and moveable relative to the first capacitive electrode, and a biasing member configured to be physically coupled to the structural component such that a force associated with the user input causes a change in a separation distance between the first and second capacitive electrodes based on the force.

22 Claims, 9 Drawing Sheets

(56) References Cited

U.S. PATENT DOCUMENTS

| | | |
|---|---|---|
| 7,398,587 B2 | 7/2008 | Morimoto |
| 7,451,659 B2 | 11/2008 | Dallenbach et al. |
| 7,499,040 B2 | 3/2009 | Zadesky et al. |
| 7,656,465 B2 | 2/2010 | Takeda et al. |
| 7,728,487 B2 | 6/2010 | Adachi et al. |
| 7,743,667 B2 | 6/2010 | Harish et al. |
| 7,784,366 B2 | 8/2010 | Daverman et al. |
| 7,786,655 B2 | 8/2010 | Park et al. |
| 7,903,091 B2 | 3/2011 | Lee et al. |
| 8,120,229 B2 | 2/2012 | Huang |
| 8,169,416 B2 | 5/2012 | Han |
| 8,698,769 B2 | 4/2014 | Coulson et al. |
| 2002/0019711 A1 | 2/2002 | Miyashita et al. |
| 2002/0180710 A1 | 12/2002 | Roberts |
| 2003/0151589 A1 | 8/2003 | Bensen et al. |
| 2004/0112149 A1 | 6/2004 | Gebert |
| 2004/0155991 A1 | 8/2004 | Lowles et al. |
| 2004/0227736 A1 | 11/2004 | Kamrath et al. |
| 2005/0052425 A1 | 3/2005 | Zadesky et al. |
| 2005/0057266 A1 | 3/2005 | Morimoto |
| 2005/0057528 A1 | 3/2005 | Kleen |
| 2005/0061082 A1 | 3/2005 | Dallenbach et al. |
| 2006/0017701 A1 | 1/2006 | Marten et al. |
| 2006/0197753 A1 | 9/2006 | Hotelling |
| 2007/0063982 A1 | 3/2007 | Tran |
| 2007/0229464 A1* | 10/2007 | Hotelling et al. ............ 345/173 |
| 2007/0229470 A1 | 10/2007 | Snyder et al. |
| 2007/0236450 A1 | 10/2007 | Colgate et al. |
| 2007/0257821 A1 | 11/2007 | Son et al. |
| 2007/0268265 A1 | 11/2007 | XiaoPing |
| 2008/0018608 A1 | 1/2008 | Serban et al. |
| 2008/0018611 A1* | 1/2008 | Serban et al. ................ 345/173 |
| 2008/0062148 A1* | 3/2008 | Hotelling et al. ............ 345/174 |
| 2008/0068348 A1 | 3/2008 | Rosenberg et al. |
| 2008/0142352 A1 | 6/2008 | Wright |
| 2008/0190210 A1 | 8/2008 | Harish et al. |
| 2008/0202251 A1* | 8/2008 | Serban et al. .................. 73/780 |
| 2008/0202824 A1 | 8/2008 | Philipp et al. |
| 2009/0002328 A1 | 1/2009 | Ullrich et al. |
| 2009/0160682 A1 | 6/2009 | Bolender et al. |
| 2009/0160763 A1 | 6/2009 | Cauwels et al. |
| 2009/0167704 A1 | 7/2009 | Terlizzi et al. |
| 2009/0243817 A1 | 10/2009 | Son |
| 2009/0244017 A1 | 10/2009 | Pala et al. |
| 2009/0267892 A1 | 10/2009 | Faubert |
| 2010/0018889 A1 | 1/2010 | Korpanty et al. |
| 2010/0020039 A1 | 1/2010 | Ricks et al. |
| 2010/0024573 A1 | 2/2010 | Daverman et al. |
| 2010/0026664 A1 | 2/2010 | Geaghan |
| 2010/0033354 A1 | 2/2010 | Ejlersen |
| 2010/0079384 A1 | 4/2010 | Grivna |
| 2010/0090813 A1 | 4/2010 | Je et al. |
| 2010/0107770 A1 | 5/2010 | Serban et al. |
| 2010/0108409 A1 | 5/2010 | Tanaka et al. |
| 2010/0149128 A1 | 6/2010 | No et al. |
| 2010/0156814 A1 | 6/2010 | Weber et al. |
| 2010/0244628 A1 | 9/2010 | Nishigaki et al. |
| 2010/0250071 A1 | 9/2010 | Pala et al. |
| 2011/0005845 A1 | 1/2011 | Hotelling et al. |
| 2011/0025631 A1 | 2/2011 | Han |
| 2011/0148811 A1 | 6/2011 | Kanehira et al. |
| 2011/0148812 A1 | 6/2011 | Hente |
| 2011/0175844 A1 | 7/2011 | Berggren |
| 2011/0278078 A1 | 11/2011 | Schediwy et al. |
| 2012/0075243 A1 | 3/2012 | Doi et al. |
| 2012/0090902 A1 | 4/2012 | Liu et al. |
| 2012/0098783 A1 | 4/2012 | Badaye et al. |
| 2012/0105333 A1 | 5/2012 | Maschmeyer et al. |
| 2012/0242610 A1 | 9/2012 | Yasumatsu |

FOREIGN PATENT DOCUMENTS

| | | |
|---|---|---|
| WO | 9718528 | 5/1997 |
| WO | 2005121729 A1 | 12/2005 |
| WO | 2007098171 A3 | 8/2007 |
| WO | 2009157614 A1 | 12/2009 |
| WO | 2010018889 A1 | 2/2010 |

OTHER PUBLICATIONS

Korean Intellectual Property Office, International Searching Authority, "International Search Report" mailed Feb. 8, 2012; International Appln. No. PCT/US2011/034261, filed Apr. 28, 2011.

International Bureau, International Search Report and Written Opinion for International Application No. PCT/US2012/060500 dated Jan. 2, 2013.

USPTO, US Final Office Action issued in U.S. Appl. No. 12/777,829, mailed Feb. 22, 2013.

USPTO, U.S. Non-Final Office Action mailed Sep. 20, 2012 for U.S. Appl. No. 12/777,829, filed May 11, 2010.

International Bureau, Preliminary Report on Patentability for International Application No. PCT/US2011/034261 dated Nov. 22, 2012.

International Bureau, International Search Report and Written Opinion for International Application No. PCT/US2012/034540 dated Nov. 30, 2012.

International Bureau, International Search Report and Written Opinion for International Application No. PCT/US2012/052909 dated Dec. 26, 2012.

USPTO, Office Action in U.S. Appl. No. 13/238,783, mailed Oct. 28, 2013.

USPTO, Office Action in U.S. Appl. No. 12/777,829, mailed Jul. 23, 2013.

International Bureau, International Preliminary Report on Patentability in Application No. PCT/US2012/052909, dated Mar. 25, 2014.

USPTO, Final Office Action in U.S. Appl. No. 12/777,829, mailed Mar. 6, 2014.

USPTO, Office Action in U.S. Appl. No. 13/316,279, mailed Mar. 28, 2014.

USPTO, Response to Non-Final Office Action in U.S. Appl. No. 12/777,829, mailed Nov. 25, 2013.

USPTO, Response to Restriction Requirement in U.S. Appl. No. 13/316,279, mailed Feb. 11, 2014.

USPTO, Response to Non-Final Office Action in U.S. Appl. No. 13/238,783, mailed Jan. 20, 2014.

USPTO, Non-Final Office Action in U.S. Appl. No. 13/238,783, mailed Apr. 23, 2014.

USPTO, Non-Final Office Action in U.S. Appl. No. 12/777,829, mailed May 2, 2014.

USPTO, Final Office Action for U.S. Appl. No. 13/316,279, mailed Aug. 14, 2014.

USPTO, Office Action for U.S. Appl. No. 13/094,658, mailed Oct. 9, 2014.

USPTO, Final Office Action for U.S. Appl. No. 12/777,829, mailed Oct. 29, 2014.

USPTO, Final Office Action for U.S. Appl. No. 13/238,783, mailed Nov. 6, 2014.

* cited by examiner

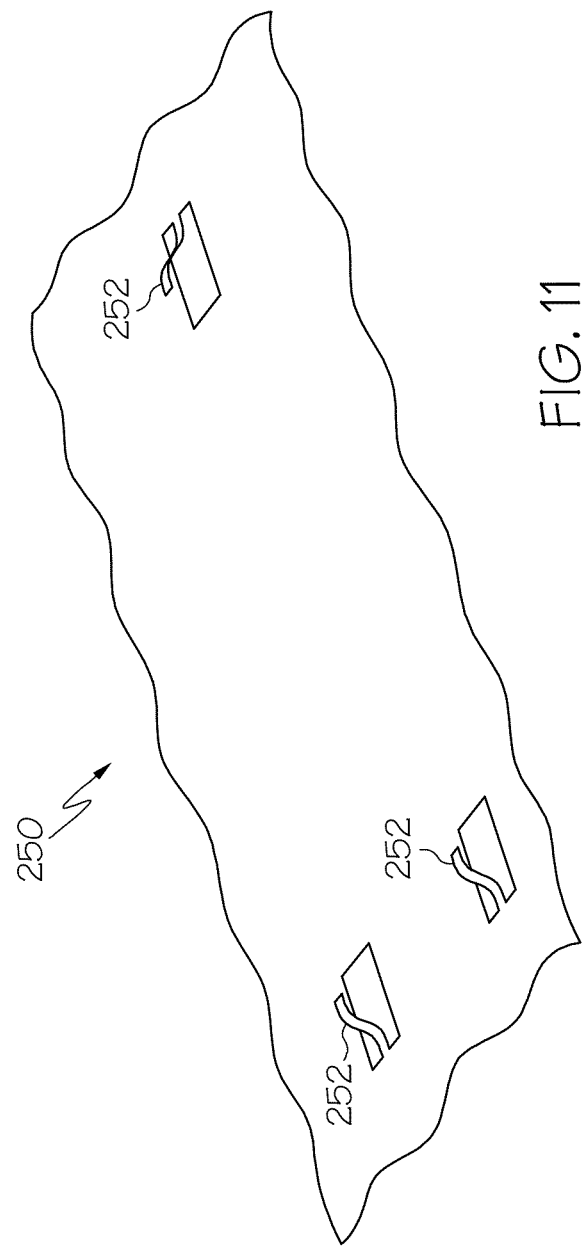

INPUT DEVICE WITH CAPACITIVE FORCE SENSOR AND METHOD FOR CONSTRUCTING THE SAME

FIELD OF THE INVENTION

This invention generally relates to electronic devices, and more specifically relates to input devices, such as proximity sensor devices.

BACKGROUND OF THE INVENTION

Proximity sensor devices (also commonly called touchpads or touch sensor devices) are widely used in a variety of electronic systems. A proximity sensor device typically includes a sensing region, often demarked by a surface, which uses capacitive, resistive, inductive, optical, acoustic and/or other technology to determine the presence, location and/or motion of one or more fingers, styli, and/or other objects. The proximity sensor device, together with finger(s) and/or other object(s), may be used to provide an input to the electronic system. For example, proximity sensor devices are used as input devices for larger computing systems, such as those found integral within notebook computers or peripheral to desktop computers. Proximity sensor devices are also used in smaller systems, including handheld systems such as personal digital assistants (PDAs), remote controls, digital cameras, video cameras, communication systems such as wireless telephones and text messaging systems. Increasingly, proximity sensor devices are used in media systems, such as CD, DVD, MP3, video or other media recorders or players.

Many electronic devices include a user interface (UI) and an input device for interacting with the UI (e.g., interface navigation). A typical UI includes a screen for displaying graphical and/or textual elements. The increasing use of this type of UI has led to a rising demand for proximity sensor devices as pointing devices. In these applications the proximity sensor device may function as a value adjustment device, cursor control device, selection device, scrolling device, graphics/character/handwriting input device, menu navigation device, gaming input device, button input device, keyboard and/or other input device. One common application for a proximity sensor device is as a touch screen. In a touch screen, the proximity sensor is combined with a display screen for displaying graphical and/or textual elements. Together, the proximity sensor and display screen function as the user interface.

In recent years, proximity sensor devices, such as touch screens, have been developed which include systems for determining the force applied by the input object onto input device in the sensing region, in addition to the positional information associated with the input object. Systems have tried to generate indirect estimates of force input using the readings that are also used to determine the positional information. However, such methods are generally unreliable and inaccurate. Other current force determining systems utilize technologies that are completely independent of those that are used to determine the positional information, which often results in increases in the costs of the devices.

There is a continuing need for improvements in input devices. In particular, there is a continuing need for improvements in force sensing systems.

BRIEF SUMMARY OF THE INVENTION

An input device is provided. The input device includes a structural component having first and second substantially opposing sides, a plurality of sensor electrodes located on the first side of the structural component, the plurality of sensor electrodes configured to capacitively sense positional information associated with user input in a sensing region, a first capacitive electrode located on the second side of the structural component, the first capacitive electrode being configured to capacitively couple to a second capacitive electrode that is separated from the first capacitive electrode by a gas and moveable relative to the first capacitive electrode, and a biasing member configured to be physically coupled to the structural component such that a force associated with the user input causes a change in a separation distance between the first and second capacitive electrodes based on the force.

A touch screen interface for an electronic device is provided. The touch screen interface includes a display screen having a viewing side and a non-viewing side and a sensing system proximate to the display screen. The sensing system includes a plurality of sensor electrodes located on the viewing side of the display screen, the plurality of sensor electrodes configured to capacitively sense positional information associated with user input in a sensing region that at least partially overlaps the viewing side of the display screen, a first capacitive electrode physically coupled to the non-viewing side of the display screen, a second capacitive electrode spaced from the non-viewing side of the display screen and at least partially overlapping the first capacitive electrode, the second capacitive electrode being moveable relative to the first capacitive electrode and separated from the first capacitive electrode by a gas, wherein the second capacitive electrode is configured to capacitively couple to the first capacitive electrode, and a biasing member configured to regulate a separation distance between the first and second capacitive electrodes such that a force associated with the user input and applied to the display screen causes the separation distance between the first and second capacitive electrodes to change based on the force.

A method for constructing an input device is provided. A circuit assembly having a flexible portion is provided. The circuit assembly is configured to physically couple to a structural component having first and second substantially opposing sides. The circuit assembly is further configured to bend around the structural component at the flexible portion thereof such that a first part of the circuit assembly at least partially overlaps the first side of the structural component and a second part of the circuit assembly at least partially overlaps the second side of the structural component. A plurality of sensor electrodes are disposed on the first part of the circuit assembly. The plurality of sensor electrodes are configured to capacitively sense positional information associated with user input in a sensing region. A first capacitive electrode is disposed on the second part of the circuit assembly. The first capacitive electrode is configured to capacitively couple to a second capacitive electrode that is separated from the first capacitive electrode by a gas and moveable relative to the first capacitive electrode. A separation distance between the first capacitive electrode and the second capacitive electrode is configured to be regulated by a biasing member configured to be physically coupled to the structural component such that a force associated with the user input causes a repeatable change in the separation distance between the first and second capacitive electrodes based on the force.

BRIEF DESCRIPTION OF DRAWINGS

The preferred exemplary embodiment of the present invention will hereinafter be described in conjunction with the appended drawings, where like designations denote like elements, and:

FIG. 11 is an isometric view of a portion of a casing, according to one embodiment of the present invention, which may be used in conjunction with the input devices described herein.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various aspects of the present invention provide input devices and methods for using and constructing such input devices that facilitate improved usability. Specifically, the input devices and methods provide a simple and reliable arrangement for determining a force applied directly or indirectly onto the input devices by an input object onto sensing regions associated with the input devices.

Figure 1:
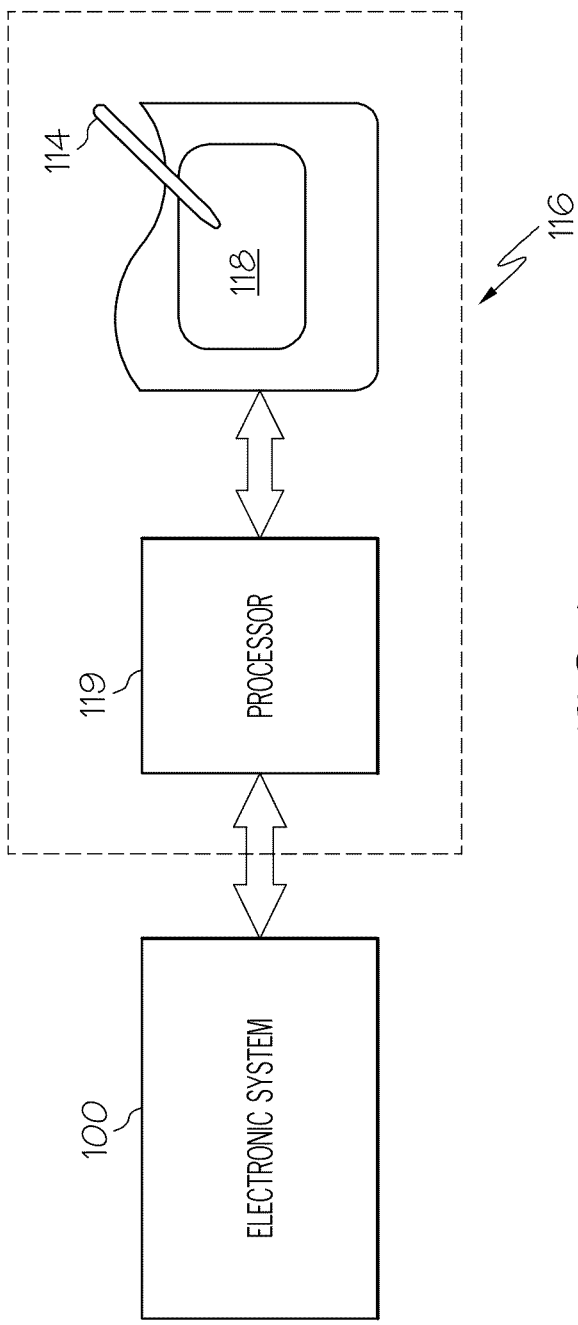
FIG. 1 is a block diagram of an exemplary system including an input device in accordance with an embodiment of the invention.

Turning now to the figures, FIG. 1 is a block diagram of an exemplary electronic system 100 that is coupled to an input device, or proximity sensor device, 116. The electronic system 100 is meant to represent any type of personal computer, portable computer, workstation, personal digital assistant, video game player, communication device (including wireless phones and messaging devices), media device, including recorders and players (including televisions, cable boxes, music players, and video players), digital camera, video camera or other device capable of accepting input from a user and of processing information. Accordingly, the various embodiments of the system 100 may include any type of processor, memory or display. Additionally, the elements of the system 100 may communicate via a bus, network or other wired or wireless interconnection. The input device 116 may be connected to the system 100 through any type of interface or connection, including I²C, SPI, PS/2, Universal Serial Bus (USB), Bluetooth, RF, IRDA, or any other type of wired or wireless connection to list several non-limiting examples.

The input device 116 (e.g., touchpad) includes a processing system (or processor) 119 and a sensing region 118. The input device 116 is sensitive to the position of an input object 114 (e.g., a stylus or a finger of a user) within the sensing region 118. "Sensing region" 118 as used herein is intended to broadly encompass any space above, around, in and/or near the input device 116 in which the sensor of the input device is able to detect a position of the object. In a conventional embodiment, the sensing region 118 extends from the surface of the sensor in one or more directions for a distance into space until signal-to-noise ratios prevent object detection. This distance may be on the order of less than a millimeter, millimeters, centimeters, or more, and may vary significantly with the type of position sensing technology used and the accuracy desired. Other embodiments may require contact with the surface, either with or without applied pressure. Accordingly, the planarity, size, shape and exact locations of the particular sensing regions will vary widely from embodiment to embodiment.

In operation, the input device 116 suitably detects a position of the input object 114 within the sensing region 118, and using the processing system 119, provides electrical or electronic indicia of the positional information to the electronic system 100. The system 100 appropriately processes the indicia to accept inputs from the user, to move a cursor or other object on a display, or for any other purpose.

The input device 116 includes a sensor (not shown) that utilizes any combination of sensing technology to implement one or more sensing regions 118. The input device 116 may use a variety of techniques for detecting the presence of an object, and may include one or more electrodes (e.g., sensor electrodes) or other structures adapted to detect object presence. As several non-limiting examples, the input device 116 may use capacitive, resistive, inductive, surface acoustic wave, and/or optical techniques. Many of these techniques are advantageous to ones requiring moving mechanical structures (e.g. mechanical switches) as they may have a substantially longer usable life. In a common capacitive implementation of a touch sensor device, a voltage is typically applied to create an electric field across a sensing surface. Capacitive input devices detect the position of an object by detecting changes in capacitance caused by the changes in the electric field due to the object.

In all of these cases, the input device 116 detects the presence of the object and delivers indicia of the detected object to the electronic system 100. For example, the sensor of the input device 116 may use arrays or other patterns of capacitive sensor electrodes to support any number of sensing regions 118.

As another example, the sensor of the input device 116 may be a capacitive "sheet sensor" that utilizes a resistive sheet, such as a uniform resistive sheet. The uniform resistive sheet is electrically coupled to (usually ohmically coupled to) sensor electrodes that receive indicia from the uniform resistive sheet. In some embodiments, these sensor electrodes may be located at corners of the uniform resistive sheet, provide current to the uniform resistive sheet, and detect current drawn away by input devices via capacitive coupling to the uniform resistive sheet. In other embodiments, these sensor electrodes are located at other areas of the uniform resistive sheet, and drive or receive other forms of electrical signals. It should be understood that in such embodiments, "sensor electrodes" are used to denote the electrodes thus electrically coupled to the uniform resistive sheet. Additionally, the sensor electrodes electrically coupled to the uniform resistive sheet may not be or be only partially located on a side of a structural component (the structural component is described below) over which the uniform resistive sheet is primarily located. In such embodiments, the uniform resistive sheet or the sensor electrodes may partially "wrap around" the edges of the structural component, as will be appreciated by one skilled in the art.

Examples of the types of technologies that may be used to implement the various embodiments of the invention can be found in U.S. Pat. No. 5,543,591, U.S. Pat. No. 5,648,642, U.S. Pat. No. 5,815,091, and U.S. Pat. No. 6,259,234, each assigned to Synaptics Inc.

The processing system 119, sometimes referred to as a proximity sensor processor or touch sensor controller, is coupled to the sensor and the electronic system 100. In general, the processing system 119 receives electrical signals from the sensor, processes the electrical signals, and communicates with the electronic system 100. The processing system 119 is adapted to perform a variety of processes on the signals received from the sensor to implement the input device 116. For example, the processing system 119 may select or connect individual sensor electrodes, detect presence/proximity, calculate position or motion information, and report a position or motion when a threshold is reached, and/or interpret and wait for a valid tap/stroke/character/button/gesture sequence before reporting it to the electronic system 100, or indicating it to the user. The processing system 119 may also determine when certain types or combinations of object motions occur proximate the sensor. For example, the processing system 119 may determine the direction in which an object is moving when it lifts from the sensor, and may generate the appropriate indication in response to that motion.

In this specification, the term "processing system" is defined to include one or more processing elements that are adapted to perform the recited operations. Thus, the processing system 119 may comprise all or part of one or more integrated circuits, firmware code, and/or software code that receive electrical signals from the sensor and communicate with the electronic system 100. In some embodiments, all processing elements that comprise the processing system 119 are located together, in or near the input device 116. In other embodiments, these elements may be physically separated, with some elements of the processing system 119 close to the input device 116, and some elsewhere (such as near other circuitry for the electronic system 100). In this latter embodiment, minimal processing may be performed by the elements near the input device 116, and the majority of the processing may be performed by the elements elsewhere.

Furthermore, the processing system 119 may be physically separate from the part of the electronic system that it communicates with, or the processing system 119 may be implemented integrally with that part of the electronic system. For example, the processing system 119 may reside at least partially on a processing system performing other functions for the electronic system aside from implementing the input device 116.

Again, as the term is used in this application, the term "electronic system" broadly refers to any type of device that communicates with input device 116. The electronic system 100 may thus comprise any type of device or devices in which a touch sensor device may be implemented or coupled to. The input device 116 may be implemented as part of the electronic system 100, or coupled to the electronic system using any suitable technique. As non-limiting examples, the electronic system 100 may thus comprise any type of computing device, media player, communication device, or another input device (such as another touch sensor device or keypad). In some cases, the electronic system 100 is itself a peripheral to a larger system. For example, the electronic system 100 may be a data input or output device, such as a remote control or display device, that communicates with a computer or media system (e.g., remote control for television) using a suitable wired or wireless technique. It should also be noted that the various elements (processor, memory, etc.) of the electronic system 100 may be implemented as part of an overall system, as part of the touch sensor device, or as a combination thereof. Additionally, the electronic system 100 may be a host or a slave to the input device 116.

In some embodiments, the input device 116 is implemented with buttons or other user input devices (not shown) near the sensing region 118. The buttons may be implemented to provide additional input functionality to the input device 116. For example, the buttons may be used to facilitate selection of items using the input device 116. Of course, this is just one example of how additional input functionality may be added to the input device 116, and in other implementations the input device 116 may include alternate or additional user input devices, such as physical or virtual switches, or additional proximity sensing regions. Conversely, the input device 116 may be implemented with no additional user input devices.

Likewise, the positional information provided by the processing system 119 may be any suitable indicia of object presence. For example, the processing system 119 may be implemented to provide "zero-dimensional" 1-bit positional information, "one-dimensional" positional information (e.g. along a sensing region) as a scalar, "two-dimensional" or "three-dimensional" vector positional information (e.g. horizontal/vertical/depth axes, angular/radial axes, or any other combination of axes that span the two or three dimensions) as a combination of values, and the like. Furthermore, the term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. As will be described in greater detail below, the positional information from the processing system 119 facilitates a full range of interface inputs, including use of the input device 116 as a pointing device for cursor control.

In some embodiments, the processing system 119 may also be adapted to perform other functions in the input device 116. For example, the processing system 119 may be configured to select or connect individual sensor electrodes, detect presence/proximity, calculate position or motion information, and report a position or motion when a threshold is reached, and/or interpret and wait for a valid tap/stroke/character/button/gesture sequence before reporting it to the electronic device 100, or indicating it to the user.

It should be noted that although the various embodiments described herein are referred to as "proximity sensor devices," these terms as used herein are intended to encompass not only conventional input devices, but also a broad range of equivalent input devices that are capable of detecting the position of a one or more fingers, pointers, styli and/or other objects. In one exemplary embodiment, the input device is a touch screen. Other such devices may include, without limitation, touch pads, touch tablets, biometric authentication devices, handwriting or character recognition devices, and the like. Again, as the term is used in this application, the term "electronic device" broadly refers to any type of device that communicates with input device 116. The electronic device 100 may thus comprise any type of device or devices in which a touch sensor device and may be implemented or coupled to. Accordingly, proximity sensor devices may appropriately detect more than the mere presence or absence of an object and may encompass a broad range of equivalents.

Furthermore, the input device 116 may be implemented as part of the electronic system 100, or coupled to the electronic system 100 using any suitable technique. As non-limiting examples the electronic system 100 could thus comprise any type of computing device, media player, communication device or gaming device. In some cases the electronic system 100 is itself a peripheral to a larger system. For example, the electronic system 100 may be a data input or output device, such as a remote control or display device, that communicates with a computer or media system (e.g., remote control for television) using a suitable wired or wireless technique. It should also be noted that the various elements (e.g., display screen, processor, memory, etc.) of the electronic system 100 may be implemented as part of an overall system, as part of the input device, or as a combination thereof. Additionally, the electronic device 100 may be a host or a slave to the input device 116.

In the embodiments of the present invention, the input device 116 is adapted to provide the ability for a user to easily cause adjustments in an electronic system using the input device 116 as part of a user interface. For example, it may be used to facilitate user interface navigation, such as scrolling, panning, menu navigation, cursor control, and the like. As another example, it may be used to facilitate value adjustments, such as changing a device parameter, including visual parameters such as color, hue, brightness, and contrast, auditory parameters such as volume, pitch, and intensity, operation parameters such as speed and amplification. The input device 116 may also be used for control of mechanical devices, such as in controlling the movement of a machine.

It should also be understood that while the embodiments of the invention are to be described here in the context of a fully functioning proximity sensor device, the mechanisms of the present invention are capable of being distributed as a program product in a variety of forms. For example, the mechanisms of the present invention may be implemented and distributed as a proximity sensor program on a computer-readable signal bearing media. Additionally, the embodiments of the present invention apply equally regardless of the particular type of computer-readable signal bearing media used to carry out the distribution. Examples of signal bearing media include recordable media such as memory sticks/cards/modules, optical and magnetic disks, and hard drives.

In at least some embodiments of the invention, the input device and method are implemented with a mapping between finger (or other input object) motion on an input device and the resulting pointer motion on a computer display.

According to one aspect of the present invention, an input device is provided, which is configured to capacitively sense a force associated with user input in the sensing region 118. The input device includes a structural component having first and second substantially opposing sides. The structural component may be, for example, a rigid or flexible printed circuit board or a display device (e.g., a liquid crystal display (LCD) screen). A plurality of sensor electrodes are located on the first side of the structural component and are configured to capacitively sense positional information associated with the user input in a sensing region. A first capacitive electrode located on the second side of the structural component and is configured to capacitively couple to a second capacitive electrode that is separated from the first capacitive electrode by a gas and moveable relative to the first capacitive electrode. A biasing member is configured to be physically coupled to the structural component such that the force associated with the user input causes a change in a separation distance between the first and second capacitive electrodes based on the force.

Figure 2:
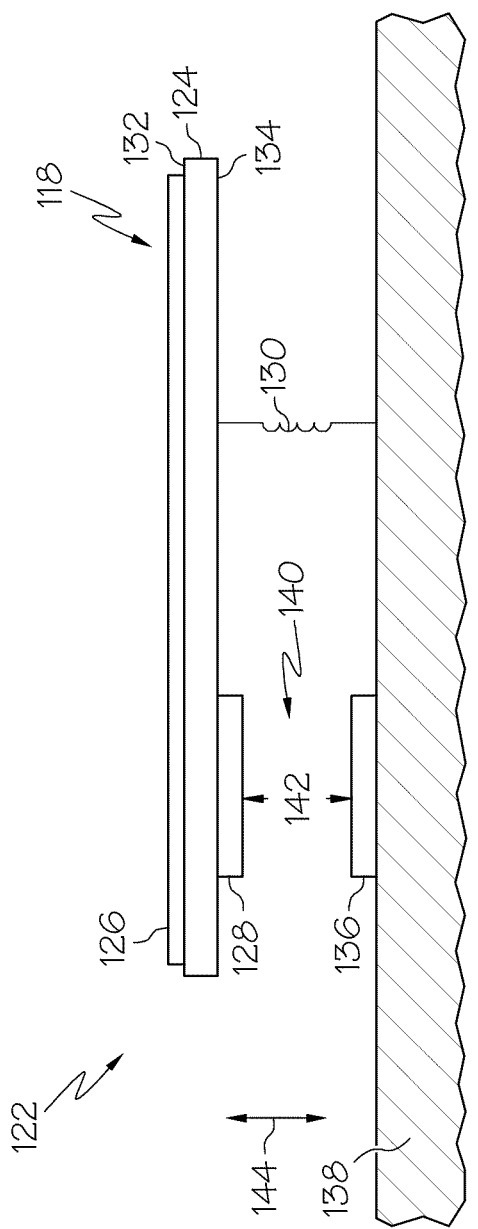
FIG. 2 is a cross-sectional side view of an input device according to one embodiment of the present invention.

FIG. 2 illustrates an input device 122, according to one embodiment of the present invention, which may be implemented as the input device 116 shown in FIG. 1. The input device 122 of FIG. 2 has been greatly simplified in representation for clarity of explanation. For example, electrical connections, routing lines, discrete components, and other components that may be part of the input device 122 but are not relevant to the current discussion, are not shown. The input device 122 includes a structural component 124, a plurality of sensor electrodes 126 (which may be arranged in an array or other pattern, or coupled to a uniform resistive sheet), a capacitive electrode 128, and a biasing member 130. The structural component 124 may be, for example, a flexible or rigid circuit board, a combination of a circuit board with other components such as stiffeners, a metal bracket, a display screen, or any number of other options. The structural component 124 has first and second substantially opposing sides 132 and 134. The sensor electrodes 126 are on the first side 132 of the structural component 124, and the capacitive electrode 128 is on the second side 134 of the structural component 124.

Although FIG. 2 shows the sensor electrodes 126 and the capacitive electrode 128 being disposed directly on the structural component 124, it should be understood that this need not be the case. To be "on" the first opposing side 132 of the structural component 124, the plurality of sensor electrodes may be indirectly disposed on, or offset from, the structural component 124, or located on that side of structural component 124 in any number of ways. For example, the sensor electrodes 126 may be disposed on a circuit assembly that is attached to structural component 124, or separated from structural component 124 by a gap (e.g., filled with air). Similarly, the capacitive electrode 128 may be "on" the second opposing side 134 of the structural component 124 in any number of ways, including being offset from the structural component 124 by a material or vacuum.

The sensor electrodes 126 are configured to capacitively sense positional information associated with user input (e.g., with one or more input objects 114) in the sensing region 118 in a manner similar to that described above. The capacitive electrode 128 may essentially comprise conductive material laid out in a solid patch or other pattern that is configured to capacitively couple with a capacitive electrode 136 that located on a base 138 separated from the capacitive electrode 128 by a gas-filled (e.g., air-filled) gap 140. It should be understood that the base 138 may not actually be a base in the sense of being a foundation or support, but the term "base" is used here to describe that it does not move (or moves predictably, repeatably, or relatively little) with the force associated with user input. The structural component 124 is configured to move with the force associated with user input, and thus and the base 138 and the structural component 124 are configured to be moveable relative to each other with user input force. Although not shown, various other electronic and non-electronic components may be part of, or disposed on, the structural component 124. For example, the structural component 124 may also include, or be physically coupled to, items such as resistors, inductors, conductive traces electrically interconnecting the various electronic components, metal or polymer pieces, and the like.

Still referring to FIG. 2, the biasing member 130 is configured to be physically coupled to, and positioned between, the second side 134 of the structural component 124 and the base 138. Although shown as a spring, it should be understood that the biasing member 130 need not have any particular spring-like response, as long as it is capable of providing biasing force. It should also be understood that, although FIG. 2 shows the biasing member 130 as connected to both structural component 124 and base 138, the biasing member 130 need not be thus affixed. For example, in some embodiments, the biasing member 130 may be physically attached to the structural component 124 and only touch the base 138 when sufficient input object force(s) is (are) applied. In other embodiments, the biasing member 130 may be physically attached to the structural component 124 and not engage the base 138 until a threshold amount of change in a separation distance 142 between the capacitive electrodes has occurred. In another embodiment, the biasing member may be physically attached to base 138 but not the structural component 124. Further, the biasing member 130 may be tuned to provide no biasing force until a threshold amount of separation distance 142 has occurred, even if the biasing member 130 is always engaged with both the structural component 124 and the base 138. Alternatively, the biasing member 130 may be designed to always provide an amount of biasing force, and bias the structural component 124 against some other component (not shown), such as a bezel or a part of a housing.

The biasing member 130 is configured to regulate the separation distance 142 between the capacitive electrodes 128 and 136. (Depending on the design of the biasing member 130, the structural component 124, and the base 138, the biasing member 130 may also regulate the distance separating the structural component 124 and the base 138.) That is, when one or more suitable input objects are in the sensing region 118 and apply a force to the structural component 124 (directly or indirectly—such as via a protective cover over the sensor electrodes 126 and the structural component 124), the structural component 124 may move towards the base 138, as indicated by arrows 144. With the structure shown in FIG. 2, in which the capacitive electrode 128 is disposed on the structural component 124 and the capacitive electrode 136 is disposed on the base 138, the movement of the structural component 124 towards the base 138 causes the capacitive electrode 128 to move relative to capacitive electrode 136. As also indicated by arrows 144, the biasing member 130 applies a force to the structural component 124 and the base 138 such that when the one or more input objects are removed from the sensing region 118, the structural component 124 moves away from the base 138 and effectively returns to its original position.

This movement of the structural component 124 relative to the base 138 causes the separation distance 142 to change. The changes in the separation distance 142, in one embodiment, cause changes in the capacitive coupling between the capacitive electrodes 128 and 136, as will be appreciated by one skilled in the art. For example, in some embodiments, an increase in the capacitance between the first and second capacitive electrodes 128 and 136 is indicative of a reduction in the separation distance 142, and thus, an increase in the force applied (i.e., directly or indirectly applied) to the structural component 124 by the one or more input objects, and vice versa.

It is worth noting that, in the embodiment shown in FIG. 2, either of the capacitive electrodes 128 and 136 may be considered to be a "first" capacitive electrode, and the other may be considered a "second" capacitive electrode.

It is appreciated that FIG. 2 shows an embodiment that may be produced using a single circuit board with two or more layers of conductive materials. A substrate or substrate stackup of the circuit board may serve as the structural component 124. One or more layers of the circuit board may contain the sensor electrodes 126, and the capacitive electrode 128 may also be disposed directly onto a side of the circuit board farther away from where input objects are expected to be (i.e., the side farther from the sensing region 118). Standard printed circuit board materials and processes may be used, including copper layers, conductive inks, solder masks, and the like. Where the circuit board is not already sufficiently rigid (e.g. where the substrate is relatively flexible, such as for some substrates formed partially or entirely of polyimide, polyethylene terephthalate (PET), or other polymers), stiffeners or brackets of any number and variety of materials may be added as appropriate.

It is also appreciated that the embodiment discussed in connection with FIG. 2 may have a large number of variations, just as the embodiments discussed below, in connection with the other figures. For example, any number and variety of sensor electrodes 126, structural components 124, capacitive electrodes 128 and 136, and bases 138 may be used. As another example, the systems may be constructed in which the base 138 moves with the force associated with the user input instead of structural component 124. Such an alternative is also quite viable, as long as the separation distance 142 may still be regulated such that a same user input force application would result in substantively the same change in separation distance. As yet another example, the capacitive electrodes 128 and 136, and the biasing member 130, need not be directly in-line with structural component 124, and may be located in extensions from the structural component 124.

As a further example, either or both of the capacitive electrodes 128 and 136 may be formed as part of existing materials. In such cases, the capacitive electrodes 128 or 136 may be embedded, flush with a surface, or more flush with the surface, than depicted. For example, a commercial sensor for incorporation in an electronic system may supply capacitive electrode 128 (which moves with user input force in FIG. 2) to couple to an existing conductive feature in the electronic system, capacitive electrode 136 (which does not move with user input force in FIG. 2) to couple to an existing conductive feature in the electronic system, or both capacitive electrodes 128 and 136. Where appropriate, the capacitive electrodes 128 or 136 may be physically coupled in any number of ways to the structural component 124 or the base 138. For example, capacitive electrodes 128 or 136 may be attached to the structural component 124 or the base 138 by methods involving adhesives, fasteners, clamping forces, and the like. Alternatively or in addition, capacitive electrodes 128 or 136 may even be formed as part of the structural component 124 or the base 138.

Figure 3:
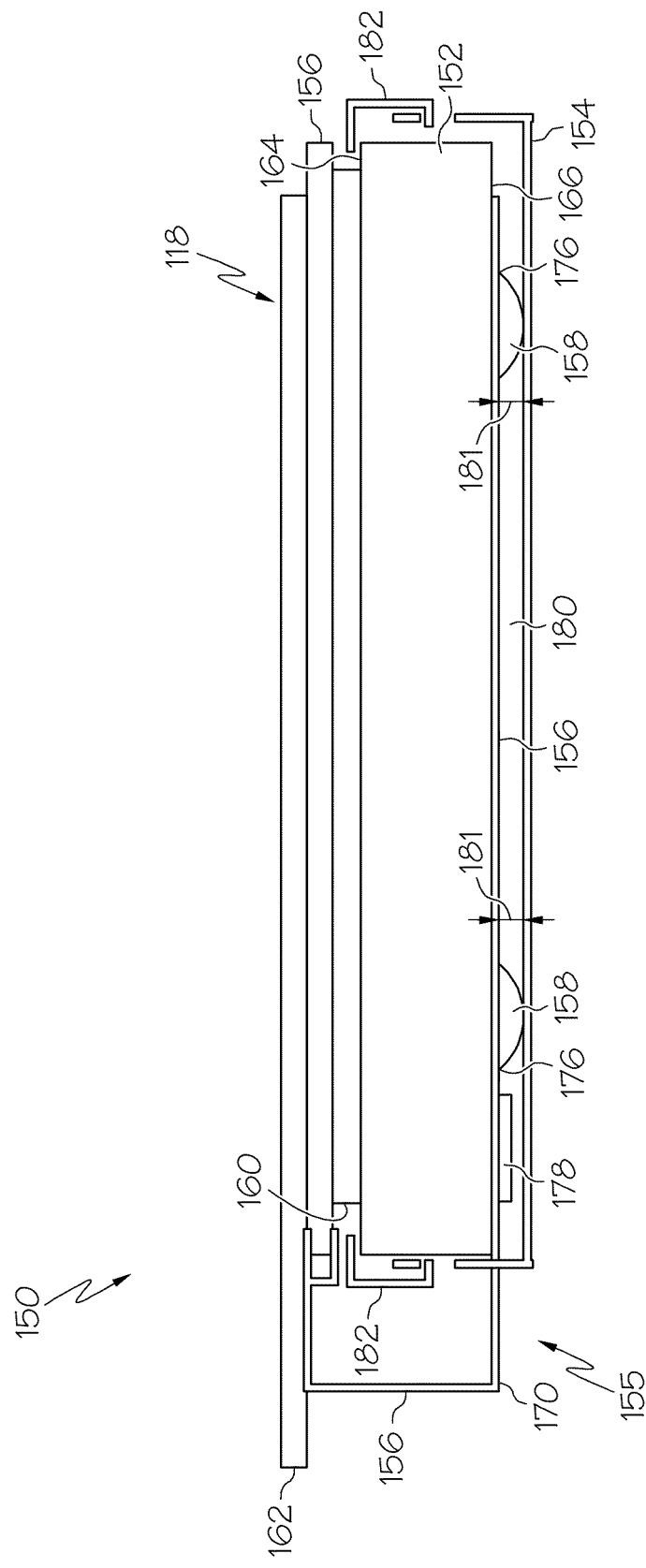
FIG. 3 is a cross-sectional side view of an input device according to another embodiment of the present invention.
Figure 4:
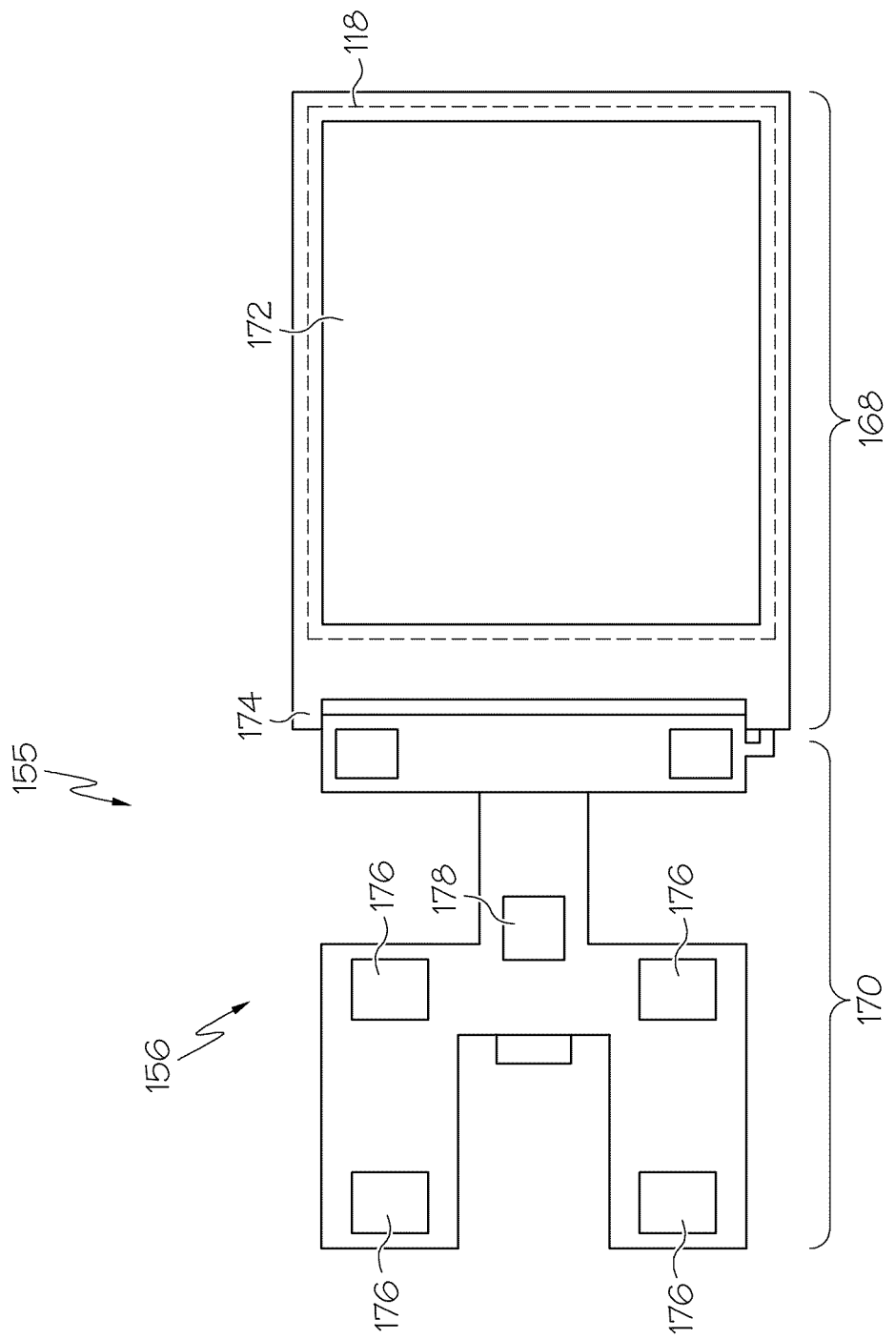
FIG. 4 is a plan view of a circuit assembly within the input device of FIG. 3.

FIGS. 3 and 4 illustrate a touch screen input device 150, according to an exemplary embodiment of the present invention that operates in a manner similar to the embodiment shown in FIG. 2. The input device 150 includes a display screen 152, a casing 154, a sensing system 155, and a protective cover 162. The sensing system 155 includes a circuit assembly 156, capacitive electrodes 176, and biasing members 158. The capacitive electrodes 176 are configured to couple capacitively to one or more capacitive electrodes (not shown) provided, for example, on the casing 154.

The display screen 152 has first and second sides 164 and 166 (i.e., a "viewing" side 164 that is designed to be viewable to users and a "non-viewing" side 166 that opposes the viewing side in many embodiments). In comparison with FIG. 2, the viewing side 164 is analogous to the first side 132 and the non-viewing side 166 may be analogous to the second side 134 (if the viewing side and the non-viewing side are opposite each other). In one embodiment, the display screen 152 is a LCD screen with a polarizer 160, as is commonly understood, although other display technologies are contemplated and may be used. The display screen 152 is configured to generate one or more images that are visible to a user on, or looking from, the viewing side 164. The polarizer 160 of the LCD-type display screen 152 is positioned on the viewing side 164 of the display screen 152, and is configured to allow only particular polarizations of light to pass therethrough, as is commonly understood. It should be understood that the polarizer 160 is not required for some display screen technologies and, like many other components described here, are optional in embodiments of the present invention.

Referring specifically to FIG. 4, the circuit assembly 156, in one embodiment, includes a rigid portion 168 and a flexible portion 170. The rigid portion 168 includes a substantially transparent substrate that includes an array of sensor electrodes in a sensor electrode area (or simply "sensor electrodes") 172, in manner similar to those described above, that define the sensing region 118. The flexible portion 170 of the circuit assembly 156 is connected to an edge region 174 of the rigid portion 168 and includes multiple (e.g., four are shown) capacitive electrodes (which may be referred to as "first capacitive electrodes") 176 formed thereon and an integrated circuit (or controller) 178 mounted thereto. Like discussed above, the integrated circuit 178 may include all or part of the processing system, or processor, which may provide functionality for the sensing system 155 in manner described above. It should be noted that FIG. 4 shows the circuit assembly 156 in an "unfolded" or "unbent" arrangement (i.e., the circuit assembly is not wrapped around the display screen 152 (not shown in FIG. 4)). In this case, sensor electrodes 172 and the capacitive electrodes 176 are "facing" substantially the same direction.)

Referring again to both FIGS. 3 and 4, when installed in the input device 150, the rigid portion 168 of the circuit assembly 156 is positioned over the polarizer 160 with the sensor electrodes 172 on a side of the rigid portion 168 of the circuit assembly 156 that is facing away from the display screen 152. The sensor electrodes 172, and the sensing region 118 defined by the sensor electrodes 172, at least partially overlap the display screen 152. For example, in one embodiment, an image generated by the display screen 152 is visible through the sensor electrodes 172, and thus is overlapped by the sensing region 118. The flexible portion 170 of the circuit assembly 156 folds, or bends, around the display screen 152 and is attached to the second side 166 thereof such that the capacitive electrodes 176 face away from the display screen 152.

As shown in FIG. 3, the display screen 152 and the attached portion of the circuit assembly 156 are positioned within the casing 154 such that a gap 180 (e.g., filled with a gas such as air) lies between the capacitive electrodes 176 and the capacitive electrodes (not shown) provided on casing 154. In most embodiments, the gas also inhabits the space between the flexible portion 170 of the circuit assembly 156 and the casing 154. In one embodiment, a biasing member 158 is provided for, and positioned adjacent to, each of the capacitive electrodes 176. That is, in the embodiment shown in FIGS. 3 and 4, four biasing members 158 are provided, although only two are explicitly shown in FIG. 3 and none are shown in FIG. 4. In a manner similar to that discussed above, the biasing members 158 regulate a separation distance 181 associated with the gap 180 when a force is applied to the display screen 152 (e.g., during user input in the sensing region 118 that interacts with a physical part of the input device 150).

In the embodiment shown in FIGS. 3 and 4, the biasing members 158 are shaped and their layout configured to provide a monotonic force-displacement response (i.e., have a non-decreasing force-displacement characteristic) to forces that a typical user input would provide. Monotonic force-displacement responses are useful for many types of embodiments, although they are not required. Some biasing member designs or layouts may include some decreasing force-displacement responses, such as providing a "yielding," "snapping," or "clicking" type physical feedback. Other embodiments may use biasing member(s) to provide strictly monotonic responses (i.e., an always-increasing force-displacement response). It should also be understood that the shape of the force-displacement response curve may also be designed as appropriate to the system. For example, some embodiments may use linear or non-linear force-displacement relationships as appropriate.

To provide the appropriate force-displacement response, any number, designs, and layouts of biasing members may be used. For example, although the embodiment shown in FIGS. 3 and 4 includes four biasing members 158 having substantially dome shapes, laid out at the corners of a rectangle, other arrangements and designs may be found in other embodiments. Any other number of biasing members may be appropriate, including numbers such as one, two, and three. Other shapes may be used, including spherical, cylindrical, spiral, cantilever, leaf-spring-like, combinations thereof, and the like. Also, layout patterns with biasing members in central regions or non-rectilinear layouts may be used.

The biasing members 158 may be made of, for example, elastomeric materials (e.g., rubber), metallic materials, polymeric materials (e.g., plastic), or any combination thereof, and in other embodiments, may be shaped differently (e.g., springs).

Similarly, although four, rectangular first capacitive electrodes 176 are shown laid out in a rectangle in FIGS. 3 and 4, any number, shapes, and arrangements of first capacitive electrodes 176 may be used.

In the embodiment depicted in FIG. 3, at least a portion of the casing 154 that overlaps with the first capacitive electrodes 176 is made of a metallic material, such as steel or aluminum. This enables the casing 154 to be used as a second capacitive electrode that capacitively couples with the first capacitive electrodes 176 on the flexible portion 170 of the circuit assembly 156. For example, many casings 154 are held at a constant voltage such as ground or driven by known voltage waveforms used to guard the system. In such embodiments, no extra electrodes need to be provided to provide any second capacitive electrodes. In embodiments in which the casing 154 has conductive material overlapping with the locations of the first capacitive electrodes 176, the second capacitive electrode(s) may be effectively formed on the casing 154. However, in other embodiments, separate second capacitive electrode(s) may be attached (e.g. via adhesive or direct deposition) to a casing made of an electrically insulating material, such as a plastic. Alternatively, where preferred even if the casing 154 has sufficient conductive area to provide one or more second capacitive electrodes, separate second capacitive electrode(s) may be provided and attached to the casing 154.

In one embodiment, the integrated circuit 178 is adapted to receive indicia from one or more of the capacitive electrodes 176 and thus capacitively sense change in the separation distance 181 between the first capacitive electrodes 176 and the casing (providing the second capacitive electrode(s)) 154. Pushing-type force associated with user input in the sensing region 118 causes the sensor system 155 (and generally the display screen 152) to move towards the casing 154. Thus, the controller or another part of the processing system (e.g., which can be wholly or partially included in the integrated circuit 178) may determine the force associated with the user input and applied to the display screen 152 based on the change in the separation distance 181.

Some embodiments may use multiple sets of capacitive electrodes, each with its own separation distance. In such embodiments, the system may accommodate the multiple separation distance inputs in a variety of ways. For example, the system may use a sum, an average, a maximum, a minimum, one closest to an input object, or some other selection or filtering criterion. Alternatively, the system may estimate the force using any subset or all of the separation distances, and select among the force estimates using a variety of selection, averaging, or filtering methods.

In some embodiments, the controller or another part of the processing system may further use positional information associated with the location or velocity of any input objects applying the force in any determinations of the force associated with the user input. This may be especially useful for embodiments in which the change in separation distance varies with the location or direction of the force associated with the user input in the sensing region. In such a case, the system estimates the force using the change in the separation distance and the applicable positional information associated with the user input.

For example, the system may estimate the force using an equation with both changes in separation distance and location (and/or velocity) inputs. As an alternative or as a check, the system may estimate the force by adapting a calculation made with change in separation distance input(s). For example, an integrated circuit (or controller), or another part of the processing system, may be adapted to apply a correction factor or correction amount based on the position of the input object in the sensing region to a calculation based on the separation distance. The equation or the correction may be obtained through calibration (e.g. by taking many data points of force location and amount to derive an equation that estimates the relationships between the actual force and the change in separation distance), by models of the system response to force (e.g. by taking into account the biasing member designs, layouts, materials, etc.), by gross estimate, and the like. For example, in some embodiments, as the distance of the input object from the central portion of the structural component increases, the applied correction factor increases. In this way, an accurate determination of the applied force may be made even when the force is applied at an area which may have resulted in an inaccurate response without use of the applicable positional information.

Referring again to FIGS. 3 and 4, the pushing-type force is counteracted by the biasing members 158. Specifically, a decrease in the separation distance 142 causes the biasing members 158 to compress and apply an opposing force to the display screen 152 and the casing 154. This opposing force helps to return the display screen 152, the sensor system 155, and the components connected thereto, to their original positions when the input force is removed from the sensing region 118. Note that one or more input objects may still be in the sensing region 118, but applying no or insignificant force, when these components return to their original positions. In many embodiments, the integrated circuit 178 is also adapted to be in operative communication with the sensor electrodes in sensor electrode area 172, and sense positional information, as described above, associated with the user input in the sensing region 118.

In some embodiments, the biasing members 158 are designed to carry more than compression force, and are used to help keep the input device components together. However, this may be detrimental to the integrity of the sensor system 155 in some embodiments. Thus, referring specifically to FIG. 3, in one embodiment, the biasing members 158 are attached to only one of the circuit assembly 156 and the casing 154 such that the biasing members are not stressed if, for example, the display screen 152 experiences a torsion force and is twisted with respect to the casing 154, or if the display screen 152 experiences a tension force and is pulled away from the casing 154. For example, such forces may be applied in cases such as misuse, abuse, accident, or during maintenance. In order to secure the display screen 152 with the casing 154, the casing 154 shown in FIG. 3 also includes tabs 182 that engage, for example, only on the viewing side 164 of the display screen 152. As such, the tabs 182 carry the force when torsion or tension twists or pulls the display screen 152 away from the casing 154, but not when the display screen 152 is moved towards the casing 154. It should be understood that similar or other features may be used to produce such a tension-carrying effect. It should also be understood that some embodiments may be designed such that the biasing members 158 still carry some amount of torsion or tension, while tension-carrying features carry a large part or a predominant portion of the torsion or tension force.

Further, it should be understood that other embodiments may include features that carry compression, such that the biasing members 158 carry only part of the compressive force. This may be used to bring the expected compression forces into the range of the sensors, for example.

Figure 5:
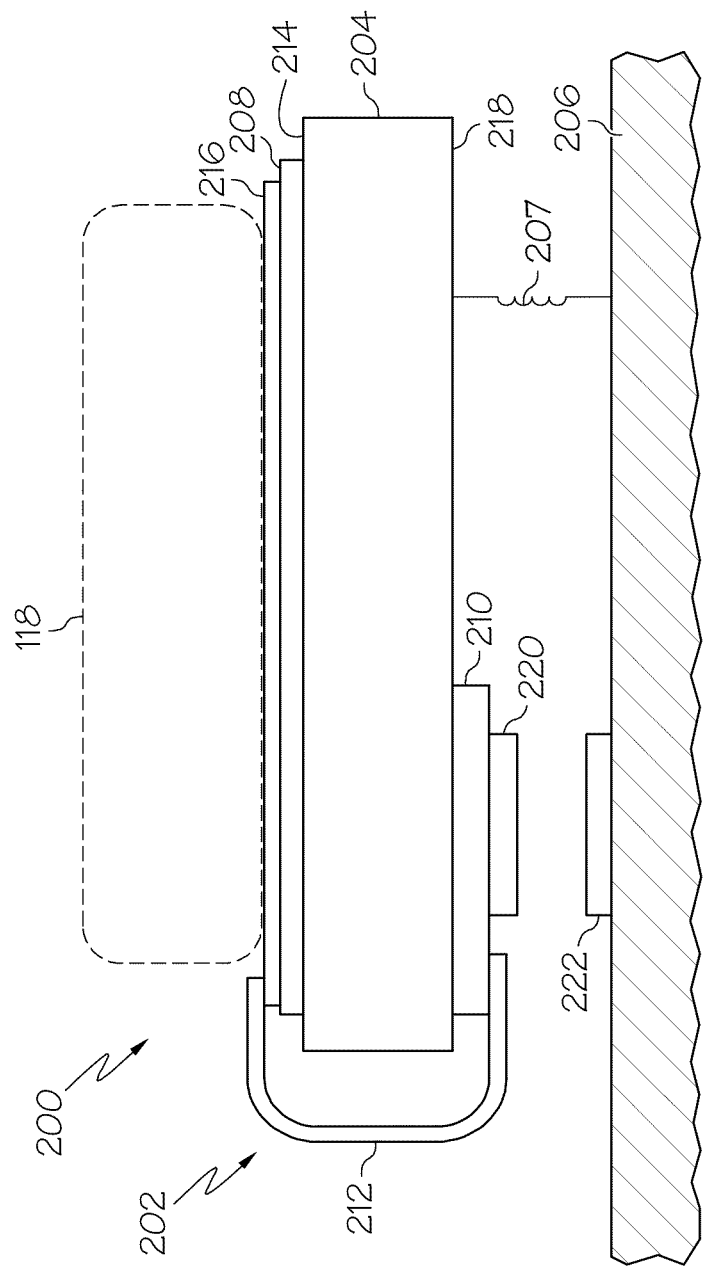
FIGS. 5-7 are cross-sectional side views of input devices according to further embodiments of the present invention.
Figure 6:
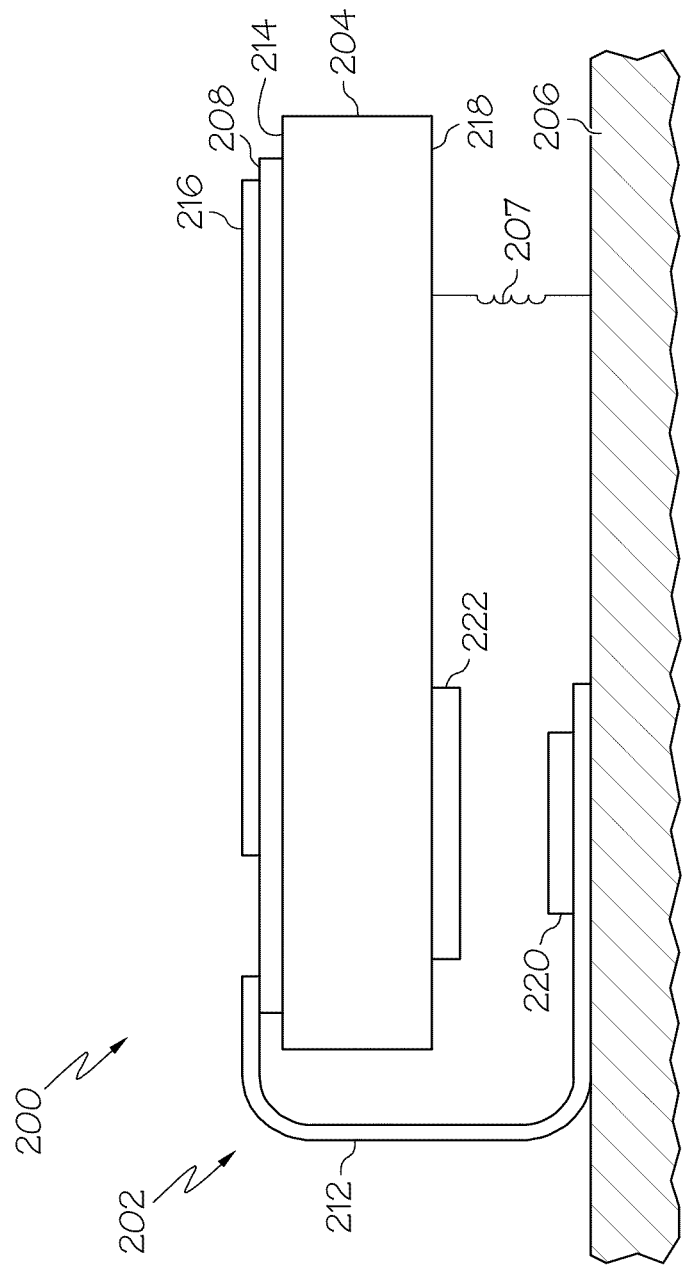
Figure 7:
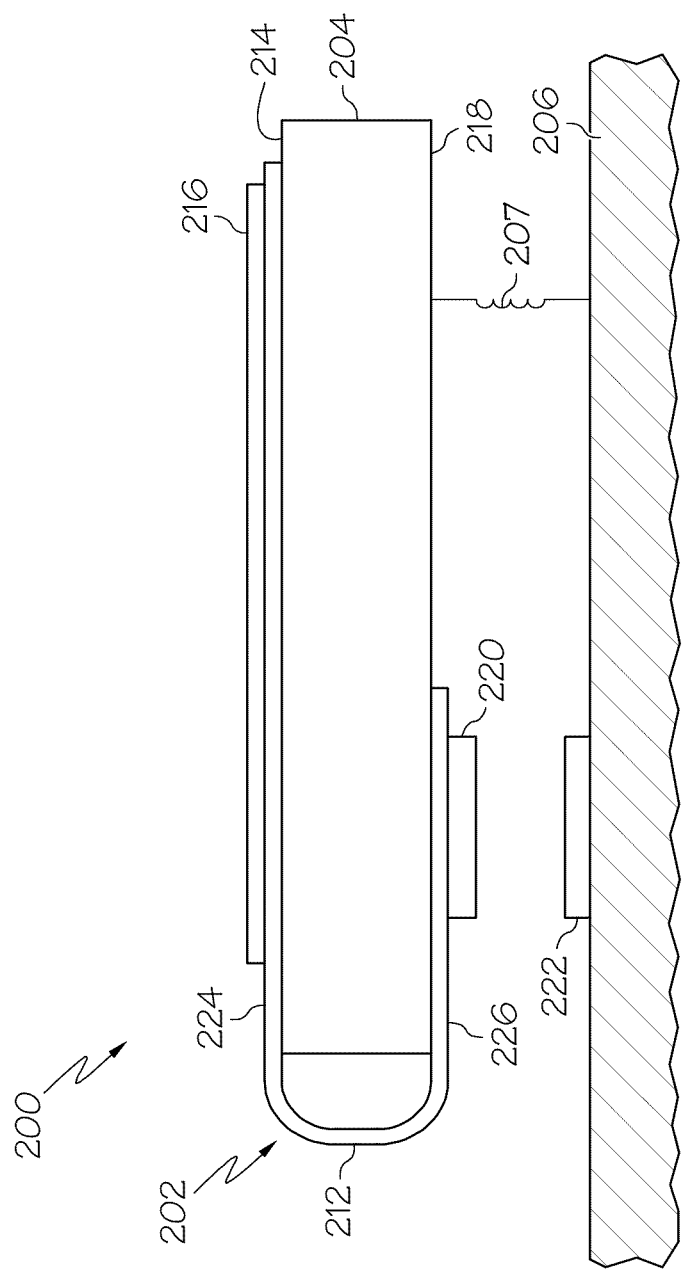

FIGS. 5-11 illustrate alternative embodiments with respect to various aspects of the present invention. In particular, FIGS. 5, 6, and 7 illustrate examples of an input device 200 with alternative embodiments of a circuit assembly 202 which may be similar in some respects to the circuit assembly 156 shown in FIGS. 3 and 4.

Similar to the embodiments described above, the input devices 200 of FIGS. 5-7 include a structural component (e.g., a display device) 204 arranged in a spaced relationship with a base (e.g., a casing) 206 with a biasing member 207 arranged therebetween, and as such, may operate in a manner similar to the previous mentioned embodiments. The rigid portions of circuit assembly 202 discussed below may be rigid due to the circuit material (e.g. a thick layer of Flame Retardant 4 (FR4) core) or the use of stiffeners or brackets. The flexible portions may use flexible substrates such as polyimide, PET, and the like. It is also worth noting that, in the embodiments shown in FIGS. 5-7, either of capacitive electrodes 220 and 222 may be considered the first capacitive electrode, and the other considered the second capacitive electrode. Further, the embodiments shown in FIGS. 5-7 have been greatly simplified for ease of explanation, and any numbers, designs, and layouts of capacitive electrodes, biasing members, and the like may be used.

In the input device 200 shown in FIG. 5, the circuit assembly 202 includes a first rigid portion 208, a second rigid portion 210, and a flexible portion 212 interconnecting the first and second rigid portions 208 and 210. The first rigid portion 208 is positioned on a first side 214 of the structural component 204 and has an array of sensor electrodes 216 disposed thereon for sensing positional information associated with user input in sensing region 118. The second rigid portion 210 is positioned on a second side 218 of the structural component 204 and has a capacitive electrode 220 disposed thereon. In a manner similar to that described above, the capacitive electrode 220 is configured to capacitively couple with a capacitive electrode 222 on the base 206. In alternate embodiments, the rigid portion 210 and associated capacitive electrode may be disposed on the base 206 instead of structural component 204, and couple to a capacitive electrode on structural component 204 instead of base 206.

In the embodiment shown in FIG. 6, the circuit assembly 202 includes a first (or a single) rigid portion 208 that has the sensor electrodes 216 disposed thereon. The flexible portion 212 of the circuit assembly 202 bends around the structural component 204 and is attached to the base 206. As shown, the capacitive electrode 220 is disposed on the flexible portion 212 of the circuit assembly 202, while the capacitive electrode 222 is attached to the second side 218 of the structural component 204. This may be accomplished, for example, by forming capacitive electrode 222 as part of the structural component 204. As with the embodiment shown in FIG. 5, an alternative embodiment places the flexible portion 212 with the capacitive electrode 220 on the second side 218 of structural component 204 instead of the base 206. In this alternative embodiment, capacitive electrode 222 is attached to base 206.

Of particular interest in the embodiment shown in FIG. 7 is that the circuit assembly 202 includes only a flexible portion 212 and does not include any rigid portions. As shown, a first region 224 of the flexible portion 212 is positioned on the first side 214 of the structural component 204 and has the sensor electrodes 216 disposed thereon. A second region 226 of the flexible portion 212 is positioned on the second side 218 of the structural component 204 and has the first capacitive electrode 220 disposed thereon. As with the embodiments shown in FIGS. 5 and 6, the flexible portion 212 may be instead designed for and attached instead to the base 206, and the capacitive electrode 222 may be instead attached to the second side 218.

Although not shown, it should also be understood that other embodiments may place portions of the circuit assembly 202 on both the second side 218 of the structural member and the base 206. In such a case, the circuit assembly 202 may contain both capacitive electrodes 220 and 222.

Figure 9:
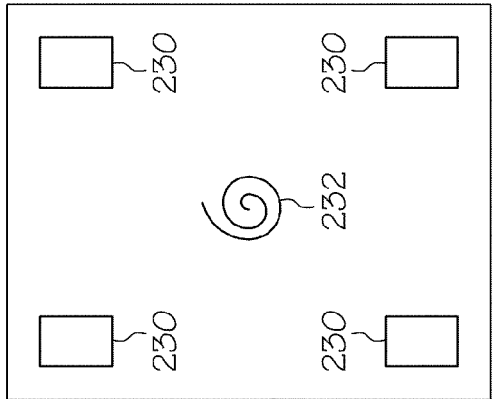
FIGS. 8-10 are plan views of arrangements of capacitive electrodes and biasing members according to further embodiments of the present invention.
Figure 10:
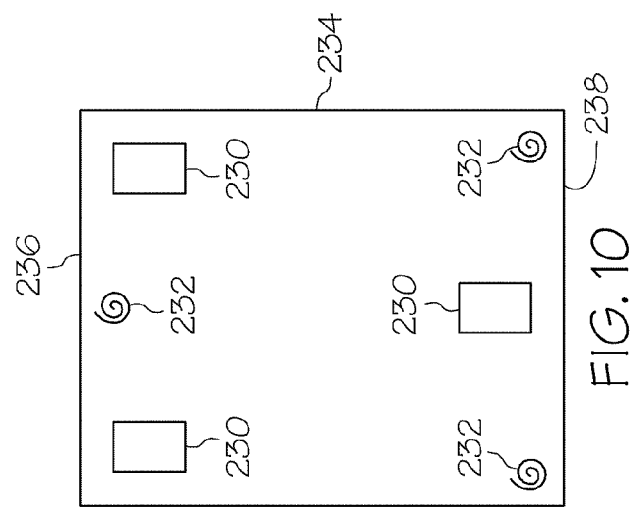
Figure 8:
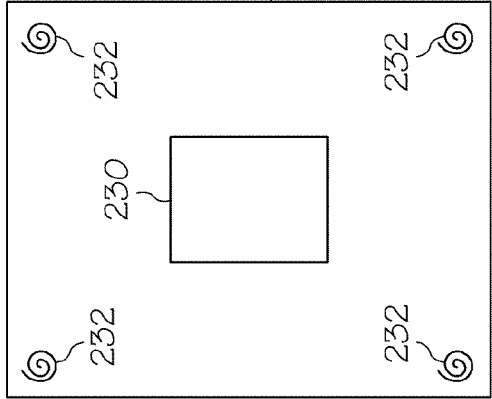

FIGS. 8, 9, and 10 illustrate various arrangements of capacitive electrodes 230 and biasing members 232 with respect to a structural component (and/or a casing) 234. It should be understood that the capacitive electrodes 230 shown may represent capacitive electrodes on the second side of the display screen (or structural component) or capacitive electrodes on the casing (or base). That is, each capacitive electrode shown in FIGS. 8-10 may represent a pair of capacitive electrodes (i.e., a first capacitive electrode and a second capacitive electrode). Thus, it should be understood that embodiments of the present invention may utilize multiple first capacitive electrodes and/or multiple second capacitive electrodes, as well as multiple biasing members. It should also be understood that the structural component (and/or a casing) 234 may not be in the shape of a rectangle, even though rectangular portions of the structural component (and/or a casing) 234 are shown in FIGS. 8-10. For clarity of explanation, the structural component (and/or a casing) 234 is referred to as the structural component 234 below. Also, for convenience of explanation, the parts shown of the structural components (and/or a casing) 234 are treated as the entirety of the structural components (and/or a casing) 234, even though it may extend beyond the rectilinear portion shown.

In the embodiment shown in FIG. 8, the capacitive electrode (or the pair of capacitive electrodes) 230 is positioned at a central portion of the structural component (and/or the casing) 234, and the biasing members 232 are positioned near respective corners of the structural component 234.

In the embodiment shown in FIG. 9, the biasing member 232 is positioned at the central portion of the structural component 234, and the capacitive electrodes 230 are positioned at respective corners of the structural component 234.

The embodiment shown in FIG. 10 includes three capacitive electrodes (or pairs of capacitive electrodes) 230 in a first triangular pattern and three biasing members 232 in a second triangular pattern intersecting the first. At one end 236 of the structural component 234, two of the capacitive electrodes (or two capacitive electrode sets) 230 are positioned near corners of the structural component 234 and a biasing member 232 is positioned therebetween. At the other end 238 of the structural component 234, two of the biasing members 232 are positioned near corners of the structural component 234, while one of the capacitive electrodes 230 is positioned therebetween.

FIG. 11 illustrates a portion of a casing 250 according to another embodiment of the present invention. This portion is often considered a "bottom piece" as it is often away from the user input side of any electronic systems it is associated with. As shown, the casing 250 includes, for example, three biasing members 252 that are connected thereto in the form of cantilever springs. In one embodiment, the biasing members 252 are formed as part of the casing (i.e., the biasing members are stamped out or injection molded with the rest of the casing 250, when the casing 250 was manufactured). As such, the biasing members 252 may be made of the same material as the casing 250.

One advantage of most embodiments of the input devices described above is that both the positional information and the force associated with the position information are determined using capacitive sensing. As a result, the overall design of the systems may be simplified, and the number of different parts required reduced. As a result, manufacturing costs are reduced. Additionally, because capacitive sensing is used for both the positional information and associated force, the electronics needed to determine both are simplified, which reduces processing time, improves performance, and further reduces costs over many previous methods of measuring force capacitively.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. An input device comprising:
    a structural component providing electrical isolation between first and second substantially opposing sides;
    a plurality of sensor electrodes located on a first region of a circuit assembly adjacent the first side of the structural component, the plurality of sensor electrodes configured to capacitively sense positional information associated with user input in a sensing region;
    a capacitive electrode pair configured to capacitively sense a separation distance therebetween, the capacitive electrode pair including a first capacitive electrode located on the second side of the structural component, the first capacitive electrode being configured to capacitively couple to a second capacitive electrode that is separated from the first capacitive electrode by a gas and moveable relative to the first capacitive electrode, wherein one of the first capacitive electrode and the second capacitive electrode are disposed on a second region of the circuit assembly; and
    a biasing member operably coupled to the structural component such that a force associated with the user input causes displacement of the biasing member and a change in the separation distance without substantially deforming the structural component;
    wherein the positional information of the user input is sensed by the plurality of sensor electrodes at the same time as the separation distance of the user input is sensed by the capacitive electrode pair.

2. The input device of claim 1, wherein the gas is air.

3. The input device of claim 1, further comprising a casing, wherein at least one of the first capacitive electrode and the second capacitive electrode is attached to the casing.

4. The input device of claim 1, further comprising a casing, wherein the biasing member is formed as part of the casing.

5. The input device of claim 1, wherein the biasing member comprises an elastomeric material, a metallic material, a polymeric material, or a combination thereof.

6. The input device of claim 1, wherein the biasing member is configured to provide a monotonic force-displacement response.

7. The input device of claim 1, further comprising a second biasing member configured to be physically coupled to the structural component, the second biasing member being configured to transmit the force associated with the user input and define the change in the separation distance between the first and second capacitive electrodes based on the force.

8. The input device of claim 1, further comprising one or more additional first capacitive electrodes located on the second side of the structural component, the one or more additional first capacitive electrodes being configured to capacitively couple to the second capacitive electrode.

9. The input device of claim 1, further comprising one or more additional first capacitive electrodes located on the second side of the structural component, the one or more additional first capacitive electrodes being configured to capacitively couple to one or more additional second capacitive electrodes, the one or more additional second capacitive electrodes being moveable relative to the one or more additional first capacitive electrode and separated from the one or more additional first capacitive electrodes by the gas.

10. A touch screen interface for an electronic device, the touch screen interface comprising:
a display screen having a viewing side and a non-viewing side; and
a sensing system proximate to the display screen, the sensing system comprising:
a plurality of sensor electrodes located on a first region of a circuit assembly attached to the viewing side of the display screen, the plurality of sensor electrodes configured to capacitively sense positional information associated with user input in a sensing region that at least partially overlaps the viewing side of the display screen;
a capacitive electrode pair electrically isolated from the plurality of sensor electrodes, the capacitive pair configured to capacitively sense a separation distance therebetween and including:
a first capacitive electrode physically coupled to a second region of the circuit assembly attached to the non-viewing side of the display screen;
a second capacitive electrode spaced from the non-viewing side of the display screen and at least partially overlapping the first capacitive electrode, the second capacitive electrode being moveable relative to the first capacitive electrode and separated from the first capacitive electrode by a gas, wherein the second capacitive electrode is configured to capacitively couple to the first capacitive electrode; and
a biasing member operably coupled to the second region of the circuit assembly for regulating the separation distance between the first and second capacitive electrodes such that a force associated with the user input and applied to the display screen causes displacement of the biasing member and a change in the separation distance without substantially deforming the circuit assembly;
wherein the positional information of the user input is sensed by the plurality of sensor electrodes at the same time as the separation distance of the user input is sensed by the capacitive electrode pair.

11. The touch screen interface for an electronic device of claim 10, further comprising a processor in operable communication with the sensing system, the processor being configured to:
capacitively detect the change in the separation distance between the first and second capacitive electrodes; and
determine the force associated with the user input and applied to the display screen based on the change in the separation distance.

12. The touch screen interface for an electronic device of claim 11, wherein the processor is further configured to determine the positional information associated with the user input.

13. The touch screen interface for an electronic device of claim 12, wherein the processor is configured to determine the force associated with the user input and applied to the display screen based on the change in the separation distance by:
estimating the force using the change in the separation distance and the positional information associated with the user input.

14. The touch screen interface of claim 10, further comprising a casing coupled to the display screen, wherein at least one of the second capacitive electrode and the biasing member is attached to the casing.

15. The touch screen interface of claim 14, wherein the at least one of the second capacitive electrode and the biasing member is formed as part of the casing.

16. The touch screen interface of claim 10, further comprising a circuit assembly physically coupled to the display screen, the circuit assembly having a flexible portion configured to bend around the display screen, wherein the plurality of sensor electrodes and the first capacitive electrode are on the circuit assembly.

17. The touch screen interface of claim 10, wherein the biasing member is configured to have a monotonic force-displacement characteristic.

18. The touch screen interface of claim 10, further comprising at least one other biasing member physically coupled to the display screen, the biasing member and the at least one other biasing member configured to provide a monotonic force-displacement response to force applied to the display screen.

19. The touch screen interface of claim 10, further comprising:
one or more additional first capacitive electrodes located on the non-viewing side of the display screen, the one or more additional first capacitive electrodes being configured to capacitively couple to the second capacitive electrode.

20. The touch screen interface of claim 10, further comprising:
one or more additional second capacitive electrodes spaced from the non-viewing side of the display screen, the one or more additional second capacitive electrodes being separated from the first capacitive electrodes by the gas and being moveable relative to the first capacitive electrodes, wherein the one or more additional second capacitive electrodes are configured to capacitively couple to the first capacitive electrodes.

21. The touch screen interface of claim 10, further comprising:
   one or more additional first capacitive electrodes located on the non-viewing side of the display screen; and
   one or more additional second capacitive electrodes spaced from the non-viewing side of the display screen, the one or more additional second capacitive electrodes being separated from the one or more additional first capacitive electrodes by the gas and being moveable relative to the one or more additional first capacitive electrodes, wherein the one or more additional second capacitive electrodes are configured to capacitively couple to the one or more additional first capacitive electrodes.

22. The touch screen interface of claim 10, further comprising a tension-carrying feature configured to carry a predominant portion of tension applied to the display screen.

* * * * *